R. GARNETT.
SEPARABLE RIM FOR TIRES.
APPLICATION FILED JAN. 24, 1918.

1,390,610. Patented Sept. 13, 1921.

INVENTOR.
RICHARD GARNETT
BY
ATTORNEY.

UNITED STATES PATENT OFFICE.

RICHARD GARNETT, OF OAKLAND, CALIFORNIA.

SEPARABLE RIM FOR TIRES.

1,390,610.　　　　　　　Specification of Letters Patent.　　Patented Sept. 13, 1921.

Application filed January 24, 1918. Serial No. 213,488.

*To all whom it may concern:*

Be it known that I, RICHARD GARNETT, a citizen of the United States, and a resident of the city of Oakland, county of Alameda, and State of California, have made a new and useful invention, to wit, Improvements in Separable Rims for Tires; and I do hereby declare the following to be a full, clear, concise, and exact description of the same.

The invention relates particularly to rims for pneumatic tires for vehicles. Among the objects of the invention are to provide a rim of the character described, simple in construction and operation; that may be produced at low cost and that is adaptable for use in connection with modern demountable rim practice.

In this specification and the annexed drawings, the invention is illustrated in the form considered to be the best, but it is to be understood that the invention is not limited to such form, because it may be embodied in other forms, and it is also to be understood that in and by the claim following the description, it is desired to cover the invention in whatever form it may be embodied.

Figure 1:
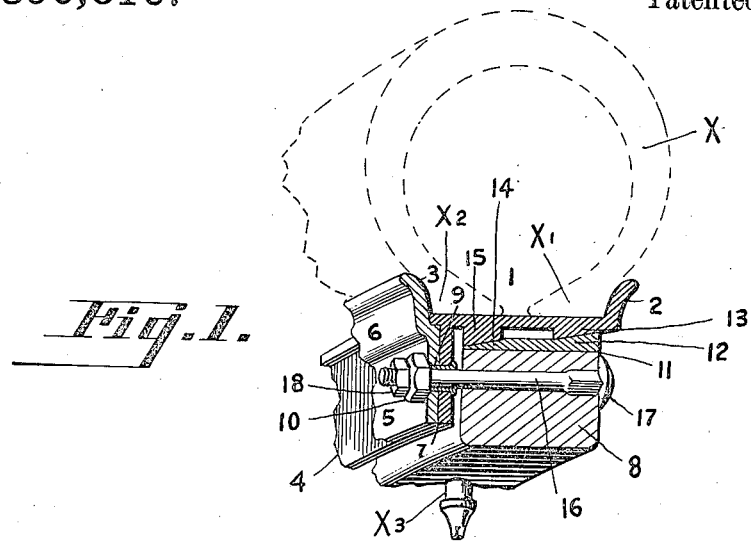
Figure 1 is a cross section in perspective of an embodiment of this invention as applied to demountable rims of the conventional type.
Figure 3:
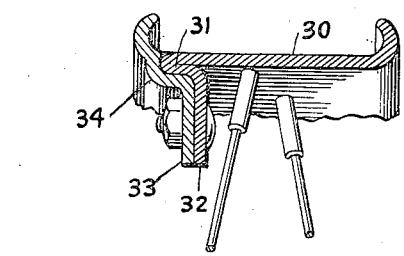
Fig. 3 is a similar view of a modification adaptable particularly to wire wheels.

In detail the construction illustrated in the drawings includes the rim annulus 1 (see Fig. 1) flanged up at the edge to form the retaining flange 2. The retaining flanges may be of any desired contour to properly engage the form of tire bead assembled thereon. The opposite retaining flange 3 on the perimeter of the annular plate 4 is provided with the offset at 5 to extend under and overlap the outer edge of the annulus 1, to give strength and insure rigid assembly of the parts. The plate 4 rests against the annular flange 7 welded to or formed as an integral part of the annulus 1 (see Figs. 1 and 3), and extending inward therefrom adjacent to but spaced from the sides of the felly 8 of the wheel. The plate 4 is removably fixed to the flange 7 by the hollow bolts 9 fixed in the flange 7 and extending through the plate 4 to receive the nuts 10 threaded thereon and bearing against the plate 4. These hollow bolts are introduced at intervals around the rim to hold the annulus and the plate 4 in rigid relation to properly perform the function of acting as a base or rim for the pneumatic tire attached thereto and fully inflated, ready for mounting upon the wheel for service.

For mounting and demounting the assembled rim, I provide the felly 8 with the felly band 11 shrunken or otherwise attached thereto in the usual manner and provided with the circumferential wedges 12 and 13, formed at the edges thereof. The annulus 1 is provided with the wedges 14 and 15 adapted to respectively engage the wedges 12 and 13 to form circumferential frictional engagement between the annulus and the felly. These inclined edges are wedged together by the tension of the bolts 16 passing through the felly 8, with the heads 17 on one side and the nuts 18 threaded on the opposite ends, the body of the bolts passing through the hollow bolts 9, against the ends of which the nuts 18 bear to force the rim assembly laterally onto the wheel, by means of which it is fixedly mounted thereon and from which it is readily demounted by removing the nuts 18 and swinging the annulus out of contact with the felly band 11. It is necessary to swing the assembled tire off the wheel because of the protrusion through the felly of the valve stem $X^3$ of the tire, which becomes the pivotal point of the swing. The holes through the felly are sufficiently large to allow for the necessary play of the valve stem $X^1$. When the rim is swung free of the wheel, the valve stem can be lifted out of the felly.

The tire X may be detached from the rim by removing the nuts 10 and lifting off the annular plate 4 which frees the bead $X^2$ of the tire, permitting the whole tire to be removed laterally from the annulus 1, for replacement or repair. The tire is attached to the annulus by reversing the operation of detachment described. In the larger sizes of tires, say 34 inches in diameter by 4 inches in cross section, up to 37 by 5, it is desirable to use the form of rim illustrated in Fig. 1, because the air capacity of tires of these larger sizes renders it a very arduous task to pump them to the necessary pressure with hand pumps; it is the practice, therefore, to assemble them on a demountable rim so that they may be carried on the vehicle ready inflated for use, the air pressure being obtained at garages, service stations, and other points, where air may be obtained under the necessary pressure. In the smaller sizes of tires, however, from 33 by 3, and smaller, the volume of air therein and the pressure required is such that they may be easily inflated with hand pumps. For that reason there is a demand for a simpler type of separable rim equally effective but obtainable at less cost, to meet which demand I propose the construction illustrated in Fig. 2, also adaptable to wire wheel construction (see Fig. 3).

Figure 2:
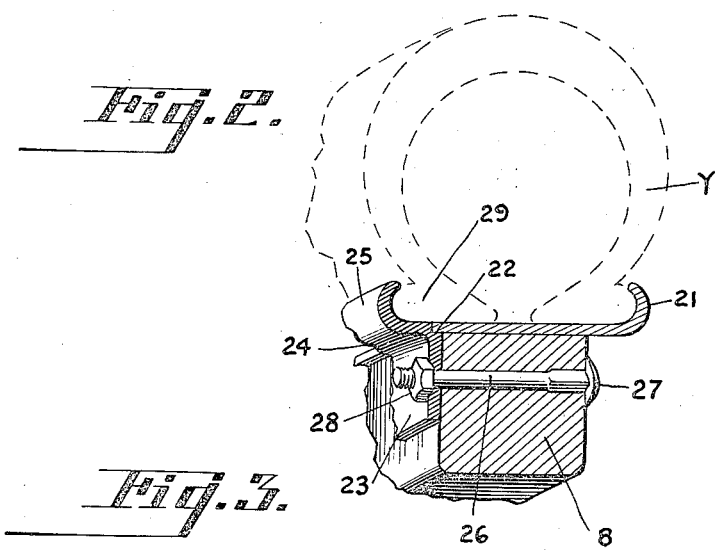
Fig. 2 is a similar view of a simplified form of separable rim adapted to be fixed in assembly upon the vehicle wheel and separable without completely dismounting the rim.

In Fig. 2 the annulus 20 is fixed permanently upon the felly 8 by being shrunken thereon or affixed with rivets extending through the felly. One edge of the annulus is curled up to form the clench 21, which may be of the "clencher" type shown in Fig. 2 or of the "straight" side type as shown at 2 and 3 in Fig. 1. The opposite edge 22 of the annulus is inclosed by the plate 23 having the annular recess 24 engaging the edge 22. The perimeter of this plate is formed into the clench 25 opposed to the clench 21 to complete the rim mounting for the tire. The plate 23 is held snugly against the side of the felly 8 by the bolt 26 passing therethrough and having the head 27 on one side of the felly and the nut 28 threaded on the opposite end of the bolt and bearing against the plate 23, by which means the plate is drawn snugly against the felly and in close contact with the edge 22 of the annulus 20, holding the rim in fixed assembly and firmly mounted upon the wheel.

The tire Y is detached from the rim by removing the nuts 28, then lifting the plate 23 off the end of the bolts and out of engagement with the bead 29 of the tire, which permits the whole tire to be removed laterally from the rim. The tires are attached by reversing this operation and may be fully inflated after all of the nuts 28 are screwed up tightly. The simplicity of this modified form of rim is sufficiently manifest.

Wire wheels being of light weight, the whole wheel and tire assembly is made demountable from the vehicle. For this class of wheels I prefer the modification shown in Fig. 3, which is a combination of the structures shown in Figs. 1 and 2. The metal of the annulus 30 is crimped at 31 to form a shoulder, the continuation forming the flange 32, that performs the same functions as the flange 7 or the felly 8, in assembling the rim. The plate 33 is beaded at 34 to engage the shoulder 31.

Various modifications within the purview of this invention will suggest themselves to those skilled in this art, in modifying the structure to meet particular tire or wheel constructions; the forms illustrated were designed to meet the present development of the tire and wheel art.

Having thus described my invention, what I claim and desire to secure by Letters Patent is:

A tire rim adapted to be removably mounted upon the felly of a wheel comprising an annulus having an outwardly extending flange on one edge and an inwardly extending flange on the opposite edge thereof; a plurality of hollow externally threaded bushings spaced around the surface of said inwardly extending flange and projecting laterally therefrom through which securing means fastened onto the felly are adapted to pass; a retaining flange provided with a plurality of openings engaging said hollow means and having an attaching portion engaging said inwardly extending flange; a plurality of nuts adapted to threadedly engage said externally threaded bushing for securing said retaining flange to said inwardly extending rim flange.

In testimony whereof, I have hereunto set my hand at San Francisco, California, this 18th day of January, 1918.

RICHARD GARNETT.

In presence of—
 BALDWIN VALE,
 LINCOLN V. JOHNSON.